(12) United States Patent
Kim (10) Patent No.: US 12,370,424 B1
(45) Date of Patent: Jul. 29, 2025

(54) PICKLEBALL PADDLE

(71) Applicant: Spartus LLC, San Francisco, CA (US)

(72) Inventor: Joshua Kim, San Francisco, CA (US)

(73) Assignee: SPARTUS LLC, San Francisco, CA (US)

( * ) Notice: Subject to any disclaimer, the term of this patent is extended or adjusted under 35 U.S.C. 154(b) by 0 days.

(21) Appl. No.: 18/812,670

(22) Filed: Aug. 22, 2024

(51) Int. Cl.
| | |
|---|---|
| *A63B 59/42* | (2015.01) |
| *A63B 102/08* | (2015.01) |
| *B32B 3/12* | (2006.01) |
| *B32B 5/18* | (2006.01) |
| *B32B 5/24* | (2006.01) |
| *B32B 27/32* | (2006.01) |

(52) U.S. Cl.
CPC ............... *A63B 59/42* (2015.10); *B32B 3/12* (2013.01); *B32B 5/18* (2013.01); *B32B 5/245* (2013.01); *B32B 27/32* (2013.01); *A63B 2102/08* (2015.10); *A63B 2209/02* (2013.01); *A63B 2225/01* (2013.01); *B32B 2262/101* (2013.01); *B32B 2262/106* (2013.01); *B32B 2266/025* (2013.01)

(58) Field of Classification Search
CPC . A63B 59/42; A63B 2102/08; A63B 2209/02; A63B 2225/01; B32B 3/12; B32B 5/18; B32B 5/245; B32B 27/32; B32B 2262/101; B32B 2262/106; B32B 2266/025
See application file for complete search history.

(56) References Cited

U.S. PATENT DOCUMENTS

| | | | |
|---|---|---|---|
| 2017/0136325 A1* | 5/2017 | Fox | A63B 59/42 |
| 2018/0104555 A1* | 4/2018 | Taylor | A63B 59/45 |
| 2021/0252356 A1* | 8/2021 | Thurman | A63B 59/42 |
| 2024/0165468 A1* | 5/2024 | Shu | A63B 59/42 |
| 2024/0189679 A1* | 6/2024 | Davis | A63B 59/45 |
| 2024/0252893 A1* | 8/2024 | Bicanic | A63B 59/40 |
| 2024/0286015 A1* | 8/2024 | Junkins | A63B 59/42 |

FOREIGN PATENT DOCUMENTS

WO    WO-2024076417 A1 *   4/2024

* cited by examiner

*Primary Examiner* — Jeffrey S Vanderveen
(74) *Attorney, Agent, or Firm* — Harness Dickey & Pierce, P.L.C.

(57) ABSTRACT

A pickleball paddle includes a handle, and a paddle head coupled with the handle. The paddle head includes a first outer faceplate, a second outer faceplate, and a core arranged between the first outer faceplate and the second outer faceplate. The core includes a honeycomb structure having multiple cells, with each of the multiple cells defined by honeycomb cell walls, and each of the honeycomb cell walls having a height. A majority of the multiple cells of the honeycomb structure are filled with a polymer, the polymer does not extend past the height of the honeycomb cell walls, and the polymer does not expand when exposed to heat.

7 Claims, 6 Drawing Sheets

PICKLEBALL PADDLE

FIELD

The present disclosure relates to a pickleball paddle, and more particularly to a pickleball paddle with high performance aerodynamic features.

BACKGROUND

This section provides background information related to the present disclosure which is not necessarily prior art.

Pickleball paddles are used by players competing in a pickleball match. A pickleball paddle includes a handle that is held by the individual, and a surface used to strike a pickleball.

SUMMARY

This section provides a general summary of the disclosure, and is not a comprehensive disclosure of its full scope or all of its features.

In an example embodiment, a pickleball paddle includes a paddle portion including a first outer surface, a second outer surface opposite the first outer surface, and a core between the first outer surface and the second outer surface. The core includes multiple cells each having a diameter of less than or equal to six millimeters. The pickleball paddle includes a handle extending from the paddle portion. A combined length of the paddle portion and the handle is at least sixteen inches. The paddle portion has a width of at least seven inches. The core has a thickness of at least 15.5 millimeters. The paddle portion and the handle have a combined weight of less than or equal to 8.4 ounces.

In other examples, the multiple cells of the core comprise a polypropylene honeycomb structure. In other examples, the combined weight of the paddle portion and the handle is less than or equal to 8.1 ounces.

In other examples, an opening is defined in the paddle portion, and the opening extends from the first outer surface to the second outer surface.

In other examples, the perimeter of the core includes a layer of ethylene-vinyl acetate (EVA) foam and a layer of weighted tape surrounding the layer of EVA foam.

In other examples, the paddle portion defines a curved head shape along at least one side of the paddle portion. In other examples, a thickness defined between the first outer surface and the second outer surface is at least sixteen millimeters.

In another example embodiment, a pickleball paddle includes a paddle portion that includes a first outer surface, a second outer surface opposite the first outer surface, and a core between the first outer surface and the second outer surface. The core includes multiple cells each having a diameter of less than or equal to six millimeters, and the multiple cells comprise a honeycomb structure. The pickleball paddle includes a handle extending from the paddle portion, wherein at least one of the first outer surface or the second outer surface includes carbon fiber, a top layer of at least one of the first outer surface or the second outer surface includes a mixture of epoxy resin and granule paint, and a thickness defined between the first outer surface and the second outer surface is at least sixteen millimeters.

In other examples, the carbon fiber comprises T700 carbon fiber having a tensile strength of at least 4900 MPa. In other examples, the granule paint has a pigmentation darker than the carbon fiber.

In other features, the carbon fiber includes hot-molded carbon fiber having a greater strength and a greater stiffness than non-hot-molded carbon fiber. In other features, the combined weight of the paddle portion and the handle is less than or equal to 8.1 ounces.

In other features, the paddle portion defines a curved heard shape along at least one side of the paddle portion, an opening is defined in the paddle portion, and the opening extends from the first outer surface to the second outer surface.

In another example embodiment, a pickleball paddle includes a paddle portion including a first outer surface, a second outer surface opposite the first outer surface, and a core between the first outer surface and the second outer surface. The core includes multiple cells arranged in a honeycomb pattern, with each of the multiple cells having a diameter of less than or equal to six millimeters. The pickleball paddle includes a handle extending from the paddle portion, wherein a thickness defined between the first outer surface and the second outer surface is at least fifteen millimeters, an opening is defined in the paddle portion, the opening extending from the first outer surface to the second outer surface, the paddle portion defines a curved head shape along at least one side of the paddle portion, and edges of the paddle portion between the first outer surface and the second outer surface do not include an edge guard.

In other examples, the handle extends from a first end of the paddle portion, the paddle portion includes a second end opposite the first end, and the opening is adjacent to the first end of the paddle portion.

In other examples, the multiple cells of the core comprise a polypropylene honeycomb structure. In other examples, each edge of the paddle portion includes at least one layer of carbon fiber, and at least one layer of fiberglass over the layer of carbon fiber.

In other examples, each edge of the paddle portion includes at least three layers of carbon fiber under the at least one layer of fiberglass. In other examples, the handle extends from the paddle portion at a first end of the handle, the handle includes a second end opposite to the first end, and the core extends through the handle from the first end to the second end. In other examples, the at least one layer of carbon fiber and the at least one layer of fiber glass may extend along an edge of the handle from the first end to the second end.

In another example embodiment, a pickleball paddle includes a handle, a paddle head including a first outer faceplate, a second outer faceplate and an inner layer between the first outer faceplate and the second outer faceplate. The second outer faceplate having aramid fibers. A first edge of the paddle head and a second edge of the paddle head opposite the first edge each taper along a longitudinal length of the paddle head at an angle greater than zero degrees and less than ten degrees with respect to the longitudinal length, and the first edge and the second edge are not parallel with each other.

The paddle head has a width where the widest portion of the paddle head is greater than or equal to 8 inches. A combined length of the paddle head and the handle at a longest portion of the paddle head and the handle is less than or equal to 16 inches. A total sum of the width of the paddle head at the widest portion and the combined length of the paddle head and the handle at the longest portion is less than or equal to 24 inches and greater than or equal to 23.5 inches.

In other examples, the aramid fibers including DUPONT KEVLAR material. In other examples, grit is located on the first outer faceplate and the second outer faceplate. The grit includes a pattern of epoxy resin.

In other examples, the grit provides an average surface roughness of greater than Rt=30 and Rz=20. In other examples, the grit provides an average surface roughness of greater than Rt=45 and Rz=35.

In other examples, a top side of the paddle head between the first edge and the second edge defines a curved shape. In other examples, the width of the paddle head adjacent the top side of the paddle head is greater than the width of the paddle head adjacent the handle.

In other examples, a frame of the paddle head includes carbon fiber. In other examples, the carbon fiber includes T700 carbon fiber having a tensile strength of at least 4900 MPa. In other examples, the carbon fiber includes hot-molded carbon fiber having a greater strength and a greater stiffness than non-hot-molded carbon fiber.

In other examples, the pickleball paddle has a swingweight that is less than or equal to 108. In other examples, the pickleball paddle has a twistweight is greater than or equal to 7.45. In other examples, the paddle head and the handles have a combined weight less than or equal to 8.1 ounces.

In other examples, the inner layer includes a core including multiple cells each having a diameter of less than or equal to six millimeters and the multiple cells of the core comprise a polypropylene honeycomb structure. In other examples, a perimeter of the core includes a layer of ethylene-vinyl acetate (EVA) foam and a layer of weighted tape surrounds the layer of EVA foam. A thickness defined between the first outer faceplate and the second outer faceplate may be at least sixteen millimeters.

In other examples, an opening is defined in the paddle head, and the opening extends through the first outer faceplate, the inner layer, and the second outer faceplate. The handle extends from an end of the paddle head opposite a top side of the paddle head, and the opening is at the end of the paddle adjacent the handle.

In other examples, edges of the paddle head between the first outer faceplate and the second outer faceplate do not include an edge guard. In other examples, the first edge, second edge and top side of the paddle head includes at least three layers of carbon fiber, and at least one layer of fiberglass over the three layers of carbon fiber. In other examples, the inner layer extends through the handle and the at least three layers of carbon fiber and the at least one layer of fiberglass extend along an edge of the handle.

An example pickleball paddle includes a handle, and a paddle head coupled with the handle. The paddle head includes a first outer faceplate, a second outer faceplate, and a core arranged between the first outer faceplate and the second outer faceplate. The core includes a honeycomb structure having multiple cells, with each of the multiple cells defined by honeycomb cell walls, and each of the honeycomb cell walls having a height. A majority of the multiple cells of the honeycomb structure are filled with a polymer, the polymer does not extend past the height of the honeycomb cell walls, and the polymer does not expand when exposed to heat.

In some examples, at least 75% of the multiple cells of the honeycomb structure are filled with the polymer. In some examples, the polymer is the only material filling the multiple cells of the honeycomb structure.

In some examples, the polymer includes polypropylene foam. In some examples, the polymer consists of polypropylene foam. In some examples, the polypropylene foam includes one or more pieces each having shapes that can fit inside each of the multiple cells of the honeycomb structure. In some examples, the outer faceplates comprise carbon fiber, fiberglass, or aramid fibers.

In some examples, each of the first outer faceplate and the second outer faceplate include first faceplate layer, a second faceplate layer, and a faceplate third layer, on each side of the paddle head, wherein the first faceplate layer consists of carbon fiber, wherein the second faceplate layer consists of carbon fiber, and wherein the third faceplate layer consists of fiberglass.

In some examples, a total sum of a width of the paddle head at a widest portion of the paddle head and a combined length of the paddle head and the handle at a longest portion of the combined length is less than or equal to 24 inches.

In some examples, the pickleball paddle includes foam arranged along outer sides of the honeycomb structure of the core. In some examples, the pickleball paddle includes edge walls including at least one carbon fiber layer which runs orthogonally to top and bottom outer faceplates, thereby sealing the core inside of the outer faceplates and the edge walls.

In some examples, a static weight of the pickleball paddle is less than or equal to 8.5 ounces. In some examples, a thickness of the paddle head is less than or equal to 15 mm. In some examples, a thickness of the paddle head is less than or equal to 17 mm.

An example method of constructing a pickleball paddle includes constructing a handle and a paddle head coupled with the handle, the paddle head including a first outer faceplate, a second outer faceplate, and a core arranged between the first outer faceplate and the second outer faceplate. The core includes a honeycomb structure having multiple cells, with each of the multiple cells defined by honeycomb cell walls, and each of the honeycomb cell walls having a height. A majority of the multiple cells of the honeycomb structure are filled with a polymer, the polymer does not extend past the height of the honeycomb cell walls, and the polymer does not expand when exposed to heat.

In some examples, the polymer is polypropylene foam, and the method includes a first step of preparing individual pieces of cured polypropylene foam into one or more shapes that can completely fit inside the multiple cells of the honeycomb structure of the core, and a second step of inserting each piece of cured polypropylene foam into a majority of the cells of the honeycomb structure of the core, wherein each piece of cured polypropylene foam that is inserted into the honeycomb structure of the core does not extend past the height of the honeycomb cell walls after insertion.

In some examples, the polymer is polypropylene foam, and the method includes a first step of injecting polypropylene foam into a majority of the multiple cells of the honeycomb structure of the core, a second step of curing the polypropylene foam inside the honeycomb structure of the core, and a third step of removing any polypropylene foam that extends past the height of the honeycomb cell walls.

In some examples, the method includes a fourth step of attaching the first outer faceplate and the second outer faceplate to the honeycomb structure of the core. In some examples, the method includes a fifth step of sealing the pickleball paddle with carbon fiber. In some examples, the method includes a sixth step of applying heat to the pickleball paddle.

Further areas of applicability will become apparent from the description provided herein. The description and specific examples in this summary are intended for purposes of illustration only and are not intended to limit the scope of the present disclosure.

BRIEF DESCRIPTION OF DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Pickleball paddles are used by competitors when competing in the sport of pickleball. Paddles can have different characteristics that affect their performance when being used. The aerodynamic features, type of core materials, type of face materials and strengthening processes may all have effects on the performance of the paddles. Some players may prefer to use a USA Pickleball (USAP) approved pickleball paddle when playing the sport of pickleball.

Some example pickleball paddles described herein utilize a specifically shaped head design (e.g., paddle surface shape) to reduce drag while, reducing or minimizing surface area of the face of the paddle. For example, the paddle may include a hole (e.g., opening) towards the throat of the paddle, to reduce drag. An edgeless paddle design may be used to facilitate a desired thickness of the paddle. Example pickleball paddles described herein may be USAP-approved.

Figure 1:
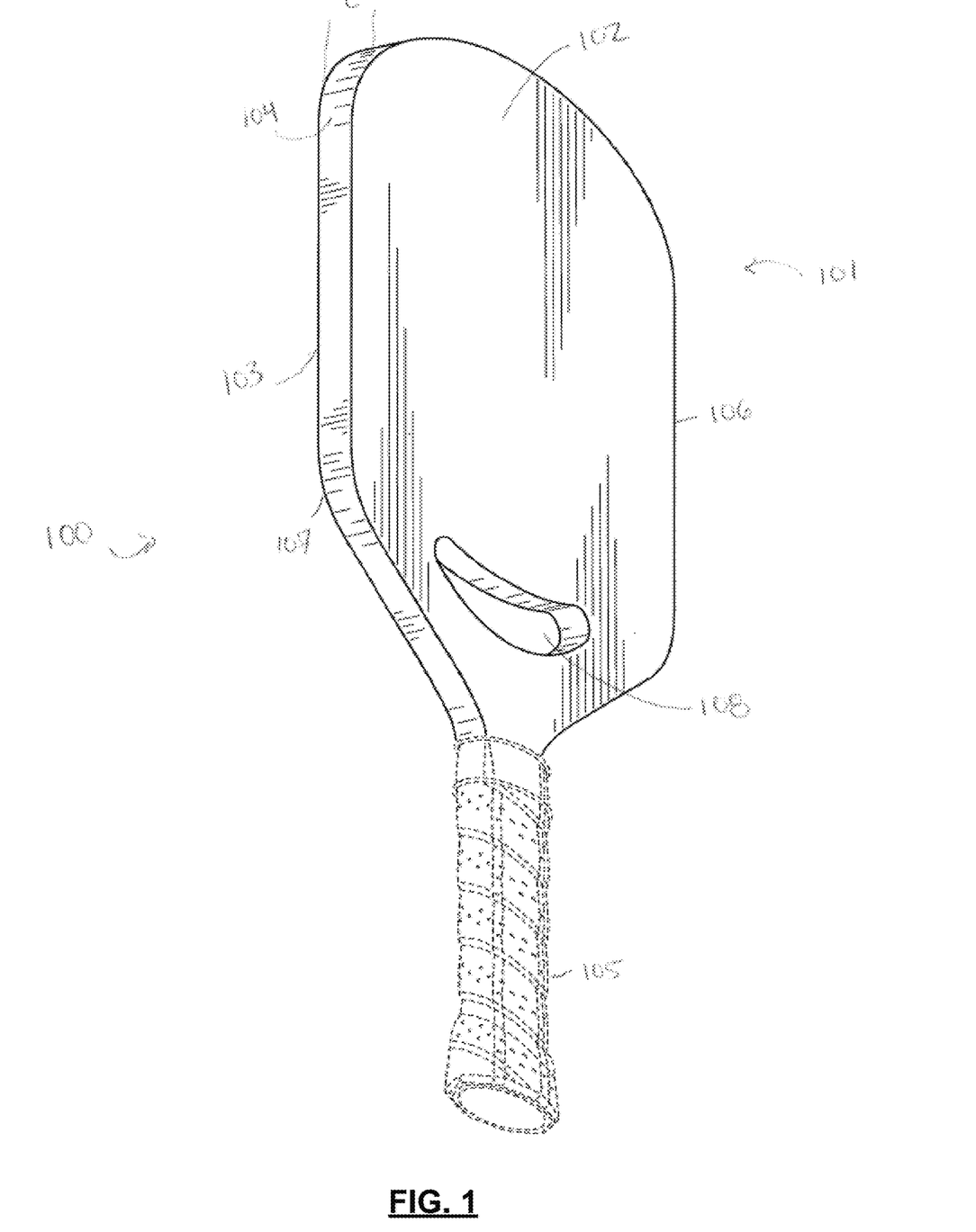
FIG. 1 is an orthogonal view of an example pickleball paddle.

FIG. 1 illustrates an example embodiment of a pickleball paddle 100 including one or more aspects of the present disclosure. The pickleball paddle 100 includes a paddle portion 101, and a handle 105 coupled to the paddle portion 101. In some examples, "coupled to" may refer to a paddle portion 101 and a handle 105 that are integral with one another, or share one or more common materials or construction pieces.

The paddle portion 101 may include a first end adjacent the handle 105, and a second opposite the first end, where the second end is defined by a curved head shape. Although FIG. 1 illustrates one example curved head shape of the paddle portion 101, other example embodiment may include other head shapes (which may include different curve sizes, curve lengths, etc.).

The paddle portion 101 includes two faces, a first outer surface 102, and a second outer surface 103 which is opposite the first outer surface 102. The paddle portion 101 includes a core 104 between the first outer surface 102 and the second outer surface 103.

The core 104 may include multiple cells each having a same or a different diameter. For example, each cell of the core 104 may have a diameter of less than or equal to six millimeters, although other embodiments may include cells having greater diameters.

As shown in FIG. 1, the core 104 has a thickness t. The thickness t (and the diameter of the cells of the core 104), may affect performance of the pickleball paddle 100, and may be selected to have desired dimensions to facilitate improved performance of the pickleball paddle 100. For example, the thickness t may be at 15 millimeters, at least 15.5 millimeters, at least 16 millimeters, or any other suitable thickness.

As mentioned above, the pickleball paddle 100 includes a handle 105 coupled to the paddle portion 101. As shown in FIG. 1, the handle 105 extends from the bottom of the paddle portion 101 to allow a user to grip the pickleball paddle 100.

In some examples, the sides of the handle 105 may have four layers of carbon fiber and fiberglass, although other example embodiments may include more or less layers, other types of layers, etc. Generally, pieces of suitable material such as plastic, wood, foam, etc., may be attached to the top and bottom faces of the handle 105 to create the width of the handle 105. A grip may be applied to the handle 105.

The handle 105 may extend from one end of the paddle portion 101. The first outer surface 102 and second outer surface 103 each have an edge 106, 107, respectively. In some examples, the core 104 and each edge 106, 107 may run all the way through paddle portion 101 (e.g., between the first outer surface 102 and the second outer surface 103) and the handle 105.

In various embodiments, the core 104 may be a polypropylene honeycomb. The cells in the core 104 may have a different diameter in various embodiments. For example, the diameter of each cell may be about 6 mm, or less than 6 mm. In some example embodiments, the core 104 may have a layer of closed cell ethylene-vinyl acetate (EVA) foam, which may be surrounded by a layer of weighted tape. The foam and layer of tape allow the distribution of mass to move outward towards the edges 106 and 107, to increase the "sweet spot" of the faces of the paddle portion 101 (e.g., increase an area on each of the first outer surface 102 and the second outer surface 103 which is suitable for striking a pickle ball).

In some example embodiments, the edges 106, 107 may include four layers, although other example embodiments may include more or less layers. For example, the edges 106 and 107 may include a bottom three layers of carbon fiber, and a layer of fiberglass on the top. The four layers provide strength for the edge 106, 107 and reduce drag of the pickleball paddle 100.

In other example embodiments, the faces may include T700 carbon fiber, with a layer of epoxy resin and granule paint mix. T700 carbon fiber may have a tensile strength of at least 4900 MPa, although greater or lesser tensile strengths may be used in other example embodiments. The pigmentation of the granule paint may be darker than the carbon fiber. In some examples, the carbon fiber may be hot-molded carbon fiber having a greater strength and a greater stiffness than non-hot-molded carbon fiber.

In various implementations, the combined weight of the paddle portion 101 and the handle 105 may be less than or equal to 8.1 ounces, although other example embodiments may have greater or lesser weights. The paddle portion 101 may include an opening 108 which extends from the first outer surface 102 to the second outer surface 103. The opening 108 reduces drag and allows the user to swing the pickleball paddle 100 more easily 100. Although FIG. 1 illustrates one example shape for the opening 108, other example embodiments may use other suitable opening shapes.

Figure 2:
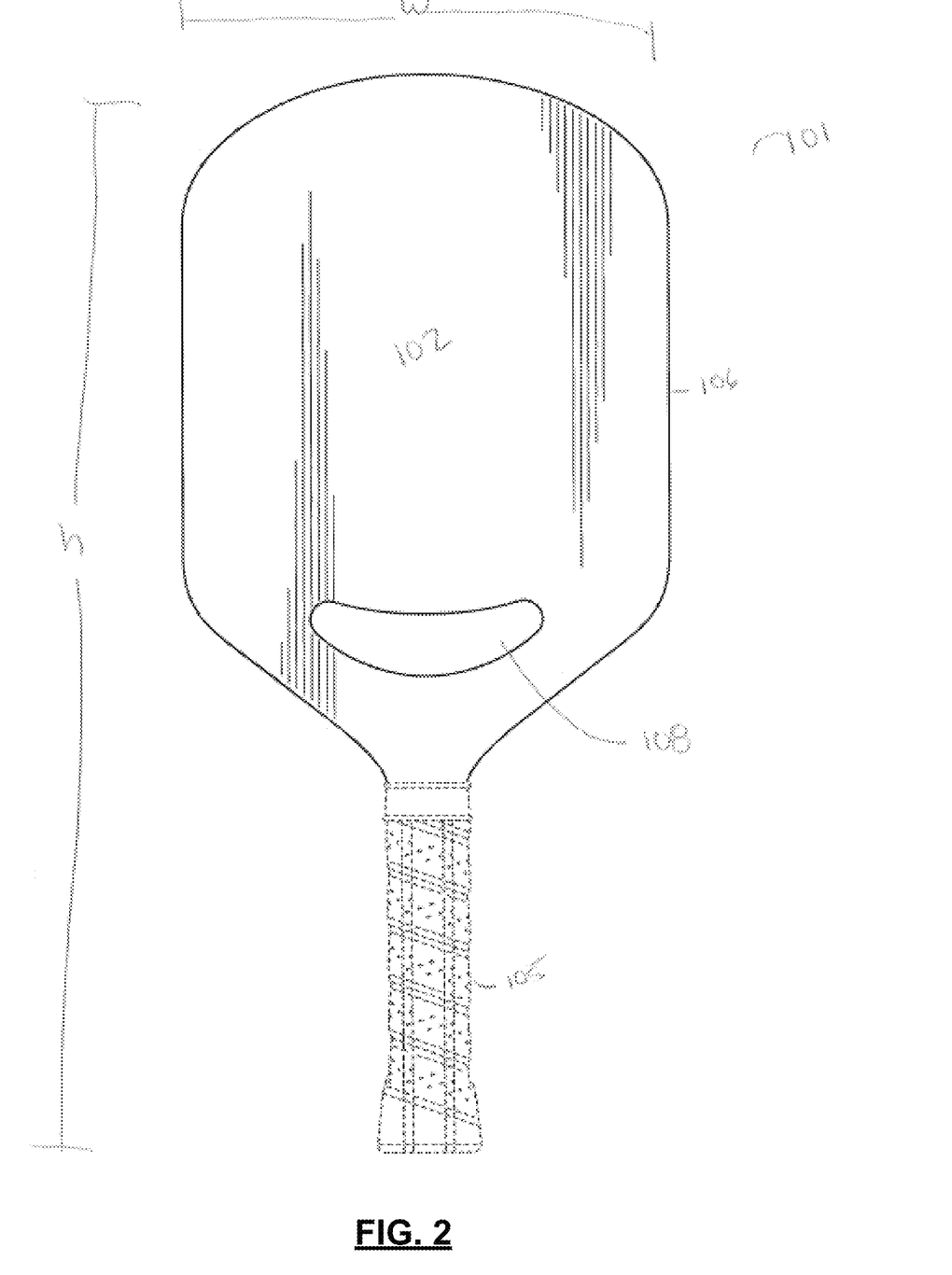
FIG. 2 is a front view of the pickleball paddle of FIG. 1.

FIG. 2 shows the front of an example paddle 100 that may include a paddle portion 101 with a first outer surface 102 and a handle 105. The first outer surface has an edge 106 that runs all the way around the first outer surface 102.

In some example embodiments, the paddle portion 101 and the handle 105 may have a combined height h of at least sixteen inches, although other example embodiments may have greater or lesser combined heights. The paddle portion 101 and the handle 105 may have a combined weight less than or equal to 8.4 ounces, although other example embodiments may have greater or lesser combined weights, such as about 8.1 ounces, etc. The paddle portion 101 may have a width w of at least seven inches, or greater or lesser widths in other example embodiments. The opening 108 may be adjacent to one end of the paddle portion 101, such as adjacent the end of the paddle portion 101 from which the handle 105 extends.

Figure 3:
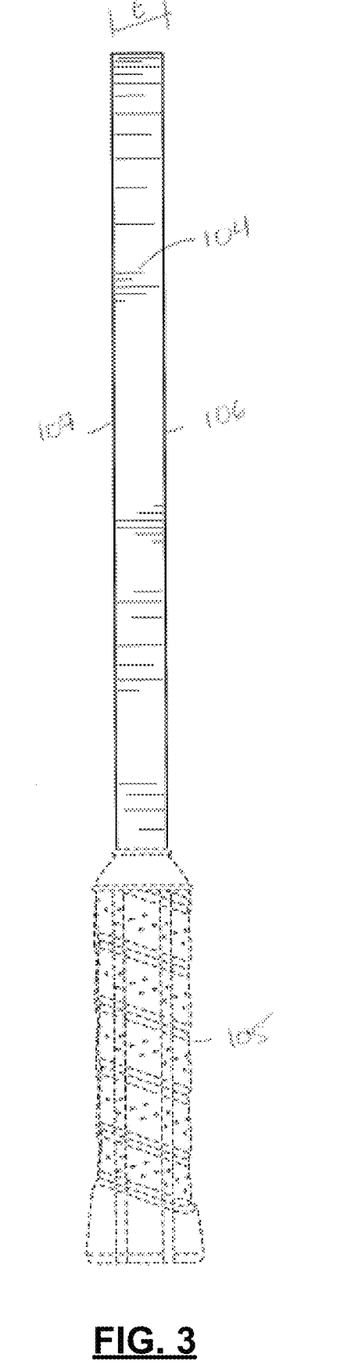
FIG. 3 is a side view of the pickleball paddle of FIG. 1.

FIG. 3 shows a side view of an example pickleball paddle 100 including edges 106, 107 for each face, and a core 104 between a first outer surface and a second outer surface. In some examples, the core 104 may have a thickness t of at least 15.5 millimeters, although other example embodiments may use lesser or greater thicknesses. As shown in FIG. 3, the paddle 100 includes a paddle portion 101 which is coupled to a handle 105, where the handle 105 is parallel to and aligned with a center of the paddle portion 101.

Figure 4:
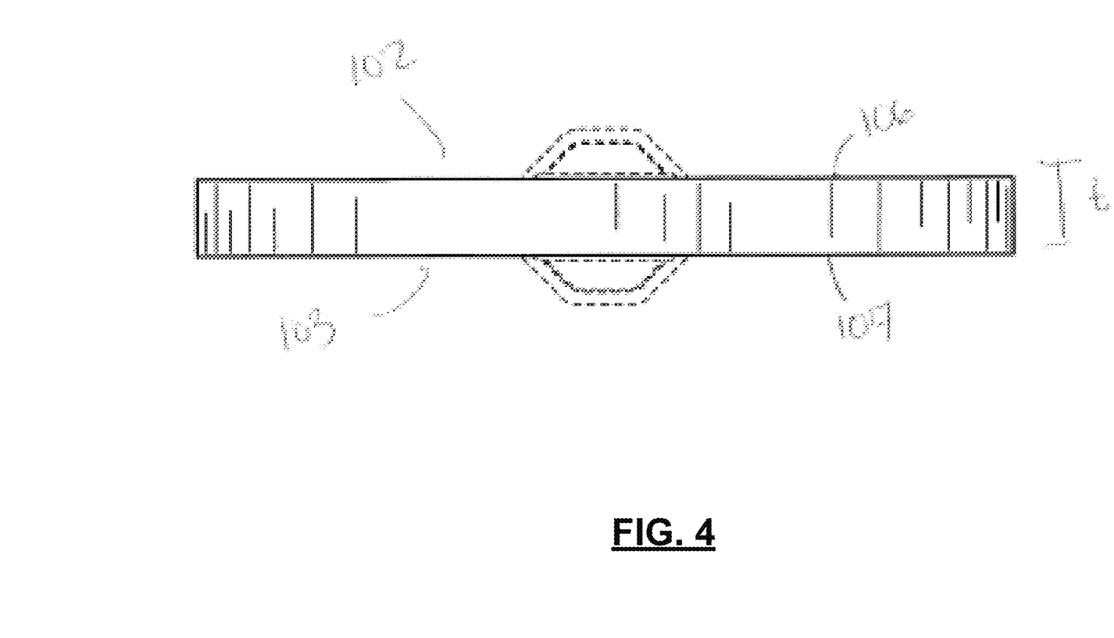
FIG. 4 is a top view of the pickleball paddle of FIG. 1.

FIG. 4 shows a top view of an example paddle 100 including a first outer surface 102 with an edge 106, a second outer surface 103 with an edge 107, and a core 104 between the first outer surface 102 and the second outer surface 103. The core 104 has a thickness t, and a handle 105 is coupled to the paddle portion 101. As shown in FIG. 4, a center of the handle 105 may be aligned with a center of the paddle portion 101.

Figure 5:
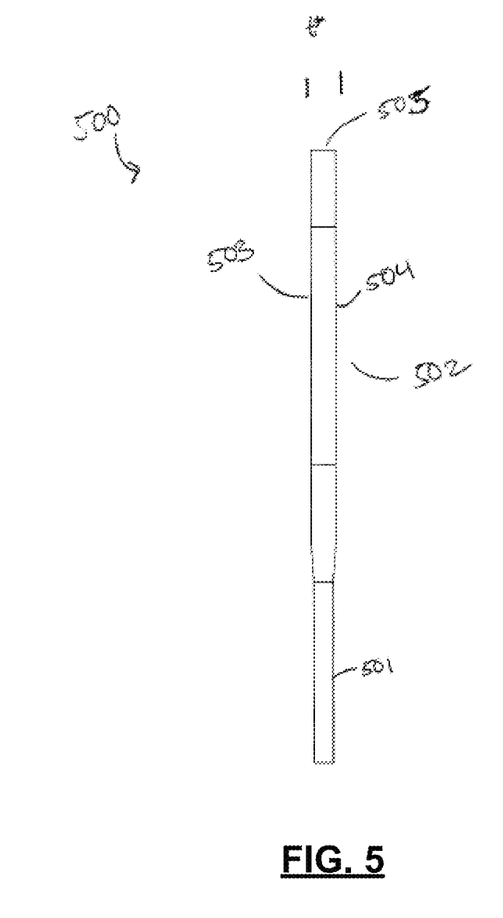
FIG. 5 is a front view of another example pickleball paddle.

FIG. 5 illustrates another example embodiment of a pickleball paddle 500 including one or more aspects of the present disclosure. The example embodiment is not limited to the features displayed in FIGS. 5-7, and may contain some of the features illustrated in FIGS. 1-4, or other suitable paddle features.

The pickleball paddle 500 includes a handle 501, and a paddle head 502 coupled to the handle 501. The paddle head 502 may include a first outer faceplate 503, a second outer faceplate 504, and an inner layer 505 sandwiched between the first outer faceplate 503 and the second outer faceplate 504.

In various embodiments, the inner layer 505 may comprise a core including multiple cells each having a diameter of less than or equal to six millimeters. The multiple cells of the core may comprise a polypropylene honeycomb structure. In other example embodiments, a perimeter of the core may include a layer of EVA foam and a layer of weighted tape may surround the layer of EVA foam.

The second outer faceplate 504 and the first outer faceplate 503 may comprise aramid fibers. The aramid fibers, for example, may comprise DUPONT KEVLAR material. The KEVLAR face may be selected to have desired performance, for example, KEVLAR may decrease harshness of a ball hitting the pickleball paddle 500. In some embodiments, the first outer faceplate 503 and the second outer faceplate 504 may have a thickness t* of at least sixteen millimeters, or any other suitable thickness.

Figure 6:
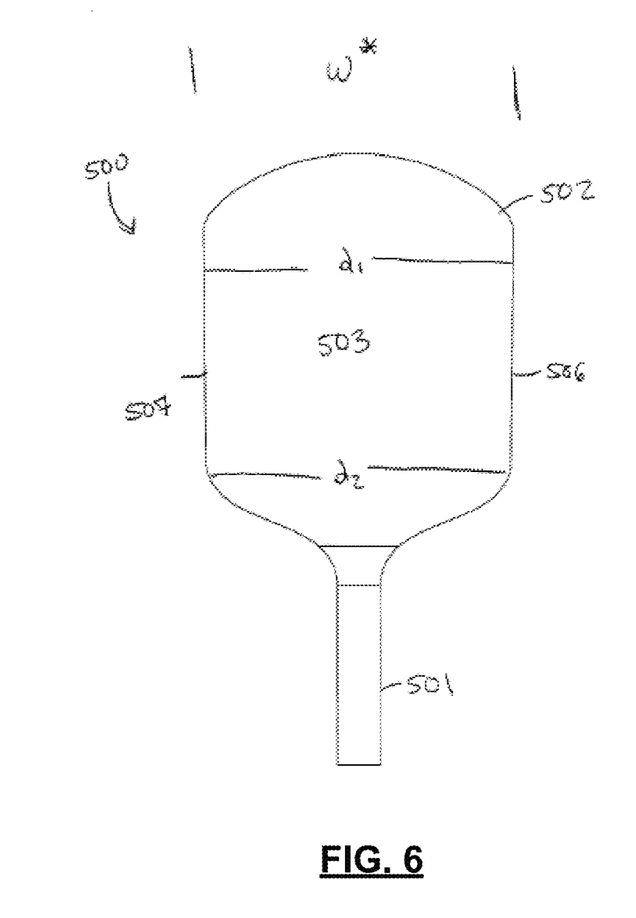
FIG. 6 is a side view of the pickleball paddle of FIG. 5.

As shown in FIG. 6, the paddle head 502 includes a first edge 506 and a second edge 507 opposite the first edge 506 that may each taper along a longitudinal length of the paddle head 502 (e.g., at an angle greater than zero degrees and less than ten degrees with respect to the longitudinal length). The taper may decrease the swingweight of the pickleball paddle 500 allowing the pickleball paddle 500 to be swing faster. In some embodiments, the swingweight of the pickleball paddle 500 is less than or equal to 108 or any other suitable swingweight.

In some example embodiments, the first outer faceplate and the second outer faceplate may comprise grit which may be comprised a pattern of epoxy resin. The grit may provide an average surface roughness, for example, greater than Rt=30 and Rz=20, Rt=45 and Rz=35, and any other suitable combination of Rt and Rz values.

In other example embodiments, edges of the paddle head 502 between the first outer faceplate 503 and the second outer faceplate 504 do not include an edge guard. The first edge, second edge and top side of the paddle head 502 may include at least three layers of carbon fiber and the at least one layer of fiberglass over the three layers of carbon fiber. In other embodiments, the inner layer 505 may extend through the handle 501 and the at least three layers of carbon fiber and the east least one layer of fiberglass extend along an edge of the handle 501.

In other example embodiments, the paddle head 502 may define an opening. The opening may extend through the first outer faceplate 503, the inner layer 505, and the second outer faceplate 504. The handle 501 may extend from an end of the paddle head 502 opposite a top side of the paddle head 502. The opening is at the end of the pickleball paddle 500 adjacent the handle 501.

FIG. 6 shows a front view of an example paddle 500 including the paddle head 502 coupled to the handle 501. The paddle head 502 including a first outer faceplate 503 with the curve top edge.

The paddle head 502 has a width w*. The width w* may affect performance of the pickleball paddle 500. For example, different widths w* can increase or decrease the sweet spot and twistweight of the pickleball paddle 500. The width w* at the widest portion of the paddle head 502 may be greater than or equal to 8 inches, although other embodiments may include the width w having a lesser length. In some embodiments, the width w* of the paddle head 502 may be greater than the width of the paddle head adjacent the handle 501. For example, a first diameter d1 is greater than or equal to a second diameter d2, as shown in FIG. 6.

In some embodiments, the twistweight of the pickleball paddle 500 is greater than or equal to 7.45 or any other suitable twistweight.

In some example embodiments, the paddle head 502 may have a top side between the first edge 506 and second edge 507 that defines a curved shape, as shown in FIG. 6. The curved shape may decrease swingweight and allow the pickleball paddle 500 to be swung faster.

Figure 7:
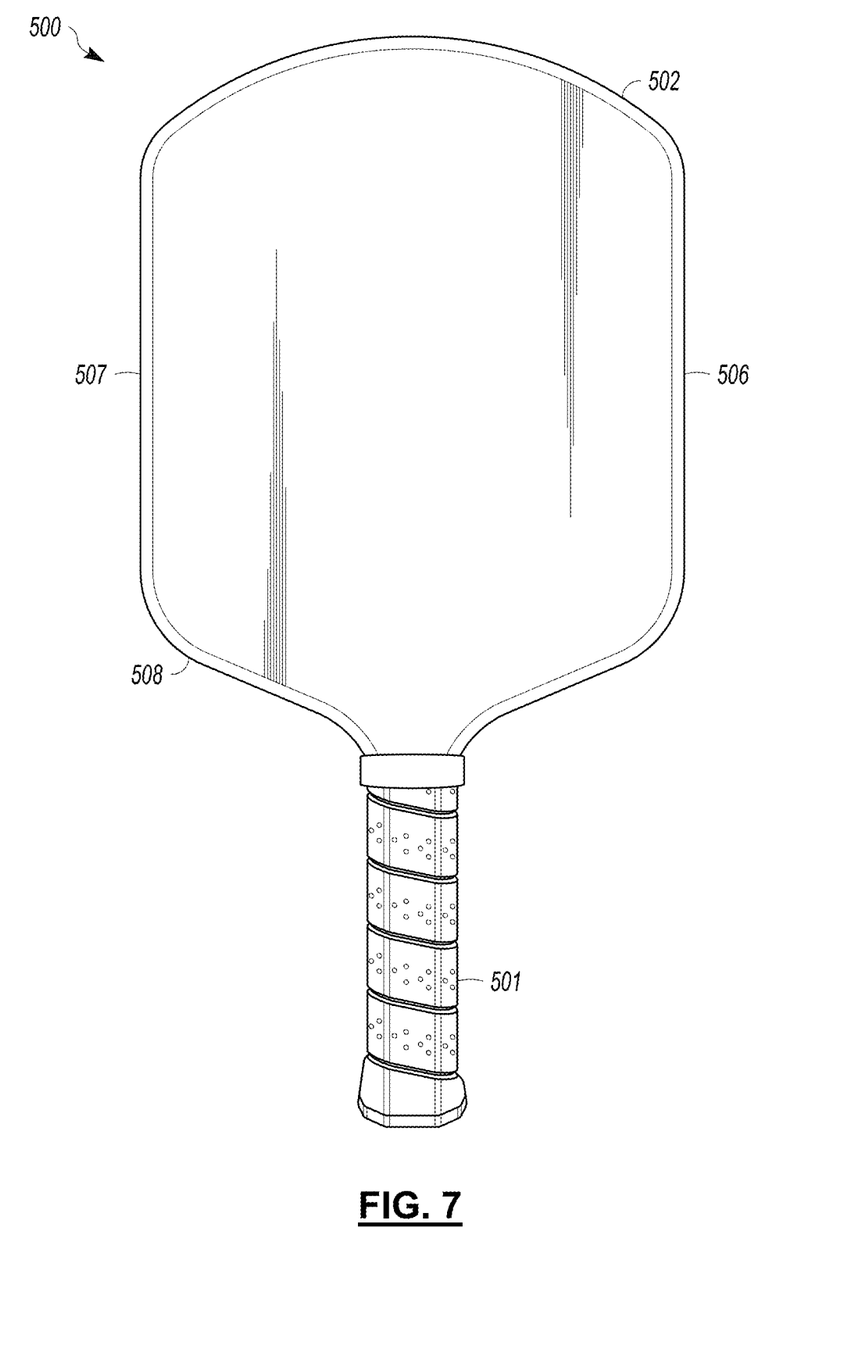
FIG. 7 is a front view of the pickleball paddle of FIG. 5 including additional features.

FIG. 7 shows a front view of an example paddle 500 including the paddle head 502 coupled to the handle 501. The paddle head 502 including a first outer faceplate 503 with the curved top edge.

In various embodiments, the paddle head 502 may have a frame 508 comprising carbon fiber, as shown in FIG. 7. The carbon fiber may comprise T700 carbon fiber having a tensile strength of at least 4900 MPa. The carbon fiber may comprise hot-molded carbon fiber. The hot-molded carbon fiber may have a greater strength and a greater stiffness than non-hot-molded carbon fiber.

Hot-molded carbon fiber may involve putting the paddle head 502 in a metal mold and applying heat in excess of 275 degrees Fahrenheit for at least 15 minutes. This process may stiffen up the paddle 500 including carbon fiber used on the frame 508.

In some example embodiments, the core of the paddle head 502 includes a honeycomb structure having multiple cells, with each of the multiple cells defined by honeycomb cell walls, and each of the honeycomb cell walls having a height. A majority of the multiple cells of the honeycomb structure are filled with a polymer, the polymer does not extend past the height of the honeycomb cell walls, and the polymer does not expand when exposed to heat.

In some examples, at least 75% of the multiple cells of the honeycomb structure are filled with the polymer. The polymer may be the only material filling the multiple cells of the honeycomb structure.

In some examples, the polymer includes polypropylene foam (e.g., the polymer may include only polypropylene foam without any other components in the polymer). For example, the polypropylene foam may include one or more pieces each having shapes that can fit inside each of the multiple cells of the honeycomb structure. In some examples, the outer faceplates comprise carbon fiber, fiberglass, or aramid fibers.

Each of the first outer faceplate and the second outer faceplate may include one or more faceplate layers, such as a first faceplate layer, a second faceplate layer, and a faceplate third layer, on each side of the paddle head. In some examples, the first faceplate layer consists of carbon fiber, the second faceplate layer consists of carbon fiber, and the third faceplate layer consists of fiberglass.

In some examples, a total sum of a width of the paddle head at a widest portion of the paddle head and a combined length of the paddle head and the handle at a longest portion of the combined length is less than or equal to 24 inches (or any other suitable length).

In some examples, the pickleball paddle includes foam arranged along outer sides of the honeycomb structure of the core. The pickleball paddle may include edge walls including at least one carbon fiber layer which runs orthogonally to top and bottom outer faceplates, thereby sealing the core inside of the outer faceplates and the edge walls.

In some examples, a static weight of the pickleball paddle is less than or equal to 8.5 ounces. In some examples, a thickness of the paddle head is less than or equal to 15 mm, less than or equal to 17 mm, etc.

An example method of constructing a pickleball paddle includes constructing a handle and a paddle head coupled with the handle, the paddle head including a first outer faceplate, a second outer faceplate, and a core arranged between the first outer faceplate and the second outer faceplate. The core includes a honeycomb structure having multiple cells, with each of the multiple cells defined by honeycomb cell walls, and each of the honeycomb cell walls having a height. A majority of the multiple cells of the honeycomb structure are filled with a polymer, the polymer does not extend past the height of the honeycomb cell walls, and the polymer does not expand when exposed to heat.

In some examples, the polymer is polypropylene foam, and the method includes a first step of preparing individual pieces of cured polypropylene foam into one or more shapes that can completely fit inside the multiple cells of the honeycomb structure of the core, and a second step of inserting each piece of cured polypropylene foam into a majority of the cells of the honeycomb structure of the core, wherein each piece of cured polypropylene foam that is inserted into the honeycomb structure of the core does not extend past the height of the honeycomb cell walls after insertion.

In some examples, the polymer is polypropylene foam, and the method includes a first step of injecting polypropylene foam into a majority of the multiple cells of the honeycomb structure of the core, a second step of curing the polypropylene foam inside the honeycomb structure of the core, and a third step of removing any polypropylene foam that extends past the height of the honeycomb cell walls.

In some examples, the method includes a fourth step of attaching the first outer faceplate and the second outer faceplate to the honeycomb structure of the core. In some examples, the method includes a fifth step of sealing the pickleball paddle with carbon fiber. In some examples, the method includes a sixth step of applying heat to the pickleball paddle.

In some examples, the polymer is neoprene foam, and the method includes a first step of preparing individual pieces of cured neoprene foam into one or more shapes that can completely fit inside the multiple cells of the honeycomb structure of the core, and a second step of inserting each piece of cured neoprene foam into a majority of the cells of the honeycomb structure of the core, wherein each piece of cured neoprene foam that is inserted into the honeycomb structure of the core does not extend past the height of the honeycomb cell walls after insertion.

In some examples, the polymer is neoprene foam, and the method includes a first step of injecting neoprene foam into a majority of the multiple cells of the honeycomb structure of the core, a second step of curing the neoprene foam inside the honeycomb structure of the core, and a third step of removing any polypropylene foam that extends past the height of the honeycomb cell walls.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A pickleball paddle, comprising:
a handle; and
a paddle head coupled with the handle, the paddle head including:
   a first outer faceplate;
   a second outer faceplate; and
   a core arranged between the first outer faceplate and the second outer faceplate, wherein,
   the core includes a honeycomb structure having multiple cells, each of the multiple cells is defined by honeycomb cell walls, and each of the honeycomb cell walls has a height,
   at least 75% of the multiple cells of the honeycomb structure are filled with a polymer,
   the polymer does not extend past the height of the honeycomb cell walls,
   the polymer does not expand when exposed to heat,
   the polymer is the only material filling the multiple cells of the honeycomb structure,
   the polymer consists of polypropylene foam,
   each of the first outer faceplate and the second outer faceplate include a first faceplate layer, a second faceplate layer, and a third faceplate layer, on each side of the paddle head,
   the first faceplate layer consists of carbon fiber,
   the second faceplate layer consists of carbon fiber or fiberglass,
   the third faceplate layer consists of carbon fiber or fiberglass, and
   at least one of the second faceplate layer and the third faceplate layer consists of fiberglass.

2. The pickleball paddle of claim 1, wherein a total sum of a width of the paddle head at a widest portion of the paddle head and a combined length of the paddle head and the handle at a longest portion of the combined length is less than or equal to 24 inches.

3. Thet pickleball paddle of claim 2, further comprising foam arranged along outer sides of the honeycomb structure of the core.

4. The pickleball paddle of claim 3, further comprising edge walls including at least one carbon fiber layer which runs orthogonally to top and bottom outer faceplates, thereby sealing the core inside of the outer faceplates and the edge walls.

5. The pickleball paddle of claim 4, wherein a static weight of the pickleball paddle is less than or equal to 8.5 ounces.

6. The pickleball paddle of claim 5, wherein a thickness of the paddle head is less than or equal to 15 mm.

7. The pickleball paddle of claim 5, wherein a thickness of the paddle head is less than or equal to 17 mm.

* * * * *